United States Patent [19]

Steinberg

[11] 4,333,704
[45] Jun. 8, 1982

[54] SOLAR ALIGNMENT DEVICE

[76] Inventor: Hyman Steinberg, 7200 NW. 78th St., Tamarac, Fla. 33319

[21] Appl. No.: 141,313

[22] Filed: Apr. 18, 1980

[51] Int. Cl.³ .............................................. G02B 5/14
[52] U.S. Cl. .................................. 350/96.10; 126/424; 350/96.23
[58] Field of Search ............... 350/96.10, 96.23, 96.24, 350/96.25; 126/424, 425; 353/3

[56] References Cited

U.S. PATENT DOCUMENTS

| | | | |
|---|---|---|---|
| 3,592,550 | 7/1971 | Christmann | 350/96.10 X |
| 3,924,954 | 12/1975 | Decret et al. | 350/96.10 X |
| 4,201,197 | 5/1980 | Dismer | 350/96.10 X |
| 4,230,290 | 10/1980 | Townsend et al. | 350/96.24 X |

Primary Examiner—John D. Lee

[57] ABSTRACT

A solar alignment device for positioning a solar grill so that its collector plate is perpendicular to the incoming rays of the sun. The device is comprised of a light-transmitting fiber cable with one end recessed below an aperture that faces the sun in front of the grill, and the other end affixed to the top of the grill, facing the viewer. The positioning of the individual fiber ends within the cable, in combination with the aperture, provides a simple, economical and precise means for adjusting the solar grill to obtain the maximum solar incidence on its collector plate.

10 Claims, 4 Drawing Figures

SOLAR ALIGNMENT DEVICE

BACKGROUND OF THE INVENTION

This invention relates generally to solar energy conversion devices, such as flat-plate collectors, and more particularly to an improved solar grill construction.

In current practice, the alignment of a solar grill, so that its collector plate is perpendicular to the sun, is accomplished by adjustment of the streaks or points of light cast on the grill, or cast on the ground, through the slots or perforations in the mirrors surrounding the collector plate. This method is an inaccurate, trial-and-error procedure which requires considerable interpretation and judgement on the part of the operator. Other known methods of alignment, such as photo-voltaic cells coupled to a meter, are prohibitive in cost and impractical for use in the manufacture of solar grills.

The present invention solves this problem by providing an extremely precise and economical alignment means using light-transmitting fibers which are recessed below an aperture and transmit light from the front face of the solar grill to a convenient viewing position on the top of the solar grill.

SUMMARY OF THE INVENTION

The present invention relates to a new and improved means for aligning a solar grill so that its collector plate is maintained perpendicular to the sun at all times during its operation, for maximum solar incidence on the collector plate.

In accordance with the present invention, a solar grill is provided with a display device consisting of a light-transmitting cable which is attached to the outer frame of the solar grill. One end of the cable is fixed at the bottom of a light-absorbent enclosure which has an aperture at its top to permit the entrance of sunlight. The other, display end of the cable, is attached to the top of the grill frame in a shaded location that is convenient for viewing by the operator of the grill.

Sunlight entering the aperture, and moving across the face of the cable end below the aperture, is transmitted to the display end of the cable where it provides information to the operator on the sun's movement relative to the grill. This information enables the operator to position the grill accurately to follow the sun's movement across the sky.

The light-transmitting fibers within the cable at the display end are spread apart to exaggerate the directional information imparted to the operator. Furthermore, one end of the cable is rotated 180 degrees, with respect to the other end, to maintain a correct right-left and up-down relationship between the sun and grill positions appearing at the display end of the cable.

Accordingly, it is an object of this invention to provide an economical means for imparting precise directional information to the operator of a solar grill with respect to its most efficient alignment.

It is a further object of this invention to permit the operator of a solar grill to rapidly interpret and to rapidly adjust the position of the grill by any well known means so that its collector plate is perpendicular to the sun's rays.

It is also an object of this invention to provide a means for accurately aligning any instrument or solar-dependent device so that it is perpendicular to the sun's rays.

In accordance with these and other objects, which will be apparent hereinafter, the instant invention will now be described with particular reference to the accompanying drawings.

DESCRIPTION OF THE PREFERRED EMBODIMENT

Figure 1:
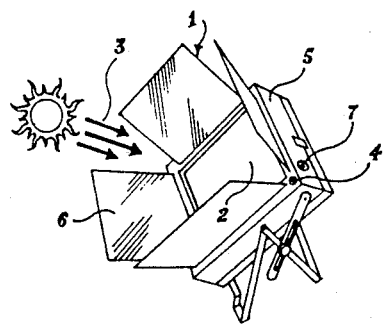
FIG. 1 is a pictorial view of a solar grill with an alignment device mounted on its frame.

Referring now in detail to the drawings, wherein an embodiment of the present invention is shown, and referring particularly to FIG. 1, a solar grill, generally designated as numeral 1, is illustrated as facing the sun, with its collector plate 2 being perpendicular to the sun's rays 3, for maximum solar incidence. The light-receiving end 4 of the alignment device is mounted permanently on the solar grill frame 5 in a position that faces the sun and is not shaded by any part of the mirrors 6 that surround the collector plate 2. The display end 7 of the alignment device, is mounted permanently on the top or uppermost surface of the solar grill frame 5, or at any other shaded, convenient viewing point.

Figure 2:
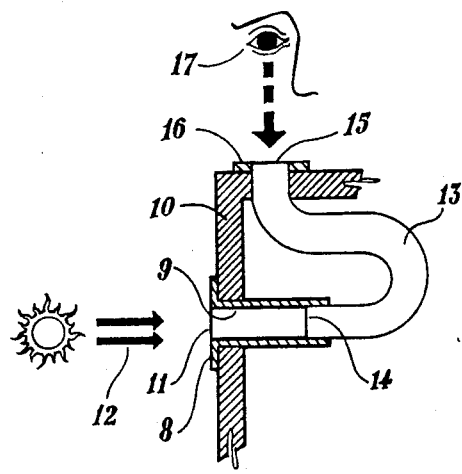
FIG. 2 is a cross-sectional, simplified view of the alignment device as installed.

FIG. 2 illustrates a simplified but typical installation of the alignment device in cross-section. An enclosure 8, having blackened, light-absorbent interior surfaces or walls 9, is mounted on the front face of the solar grill frame 10, so that an aperture 11, the smallest opening in the enclosure 8, permits only the substantially perpendicular rays of the sun 12 to penetrate the enclosure 8 and reach cable end surface 14.

A flexible, light-transmitting cable 13, comprised of either a single, plastic light-transmitting fiber or a bundle of glass or plastic fibers bound together as a unit, is fixed at the bottom of the enclosure 8 so that the cable end surface 14 faces the sun and is parallel to the collector plate surface of the solar grill. The interior wall surface 9 may be perpendicular to the collector plate surface of the solar grill. The opposite end 15, of the cable 13, is mounted on the top surface of the grill frame 10, preferably within a faceplate 16 on the top surface, so that it can be viewed conveniently by the solar grill operator 17.

Figure 3:
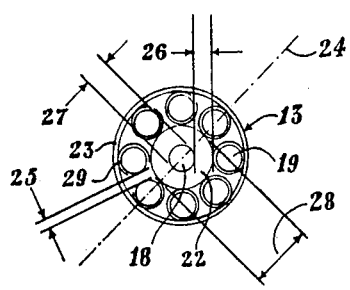
FIG. 3 is a view of the light-transmitting cable end face, as seen through the aperture of its enclosure.

FIG. 3 illustrates the face of the cable bundle end as viewed through the enclosure aperture 11, of FIG. 2. In order to provide a continuous indication of the sun's position with respect to a position that is perpendicular to the collector plate, the light-transmitting cable is preferably comprised of a central fiber 18, around which a group of individual fibers 19 are positioned in a circle. The central fiber may have more than one such circle of fibers surrounding it and each circle may be comprised of a continuous, solid ring of fibers rather than individual, separated fibers as illustrated herein. In any of these multiple-fiber arrangements, as the sun's position shifts across the sky, the beam of sunlight coming through the aperture moves across the faces of the individual fibers, illuminating them in sequence. This sequential illumination is transmitted to the display end of the cable where it provides information on the sun's position.

The central fiber 18 may be spaced apart from the fibers 19 in the surrounding ring by means of a sheath 22 around the central fiber and/or by means of sheaths 29 around the individual fibers 19. An outer sheath 23, may be used to enclose all of the fibers within the cable 13. The fibers 19 in the ring may be arranged in pairs, each pair lying on opposing ends of an axis 24 drawn through the central fiber 18. The distance 25 between each fiber 19 in the surrounding ring, as well as the distance 26 between the central fiber 18 and the ring fibers 19, should be less than the diameter of the enclosure aperture to insure that the beam of sunlight will always fall on at least one of the fiber ends during the period of operation of the alignment device. Furthermore, the aperture diameter should preferably be equal to the central fiber diameter 27, or less than the inside diameter 28 of the surrounding ring of fibers. The aperture, the enclosure and the fiber ends are preferably, but not necessarily, circular in shape.

Figure 4:
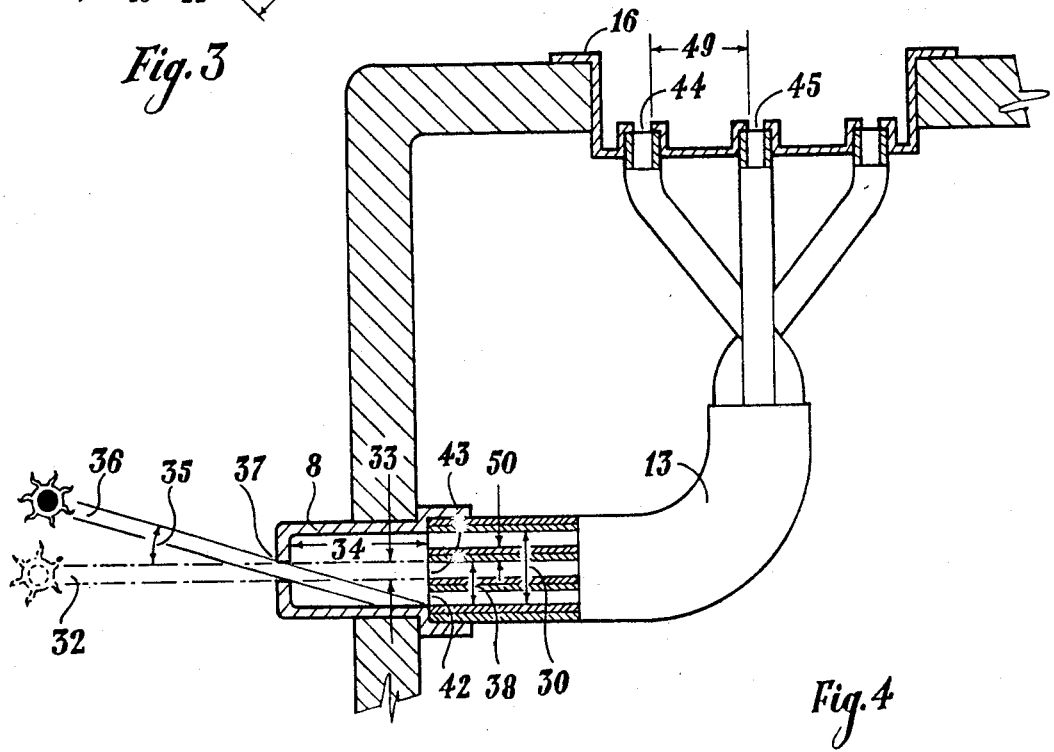
FIG. 4 shows a preferred design for a multiple-fiber alignment device with the end details illustrated in cross-section.

FIG. 4 illustrates some additional factors governing the dimensions of the components of the alignment device. The span of time during which the alignment device is operative depends upon the movement of the sun and can be controlled by varying the diameter 30 of the cable end exposed to the sun's rays 32, or the aperture diameter 33, or the recess height 34. Shading of the cable end will occur when the angle of solar incidence 35 increases sufficiently to cause the incoming light rays 36 to be blocked by the edge of the aperture 37.

In a preferred embodiment, where the aperture diameter 33 is equal to the central fiber diameter 33, the cable end dimension 38 and recess height 34 become functions of the tangent of the angle of deviation 35 of the incoming solar rays 36 from the perpendicular 32. Since the earth's rotation is one degree every four minutes, extending the operating time of the alignment device to 16 minutes would require shading of the entire cable end after the angle of solar incidence 35 has deviated from the perpendicular rays 32 by more than 4 degrees. In general, practical considerations dictate that the recess height 34 be considerably greater than the diameter 30 of the cable end. In a practical design, for instance, with equal aperture diameter 33 and central fiber diameter 33, if the desired operating time span is 16 minutes and the cable end dimension 38 is 0.062", then the recess height 34 would be:

$$Height = 0.062/\tan 4 \deg. = 0.062/0.0699 = 0.887"$$

Another factor in the design of the alignment device is the angle reversal that takes place at the aperture edge 37, which produces a reversal of the left-right and up-down relationship in the sun's position at the display end of the cable. In order to restore the correct relationship, one end of the cable must be rotated 180 degrees with respect to the other end of the cable. This 180 degree rotation automatically reverses the positions of all fiber ends surrounding the central fiber, with respect to the central fiber. For example, as the sun shifts to the higher position 36 from the position 32 below, it illuminates fiber end 42 below the central fiber 43. However, due to the rotation at the display end, fiber end 44 above the central fiber end 45 will be illuminated, thus indicating that the sun is in a higher position. Therefore, adjustment may be accomplished by moving the grill upwards, in the direction of the illuminated fiber end 44. This arrangement permits rapid recognition and adjustment of the grill position by the operator, so that the central fiber is illuminated and the grill collector plate is perpendicular to the sun's rays.

As a further aid in providing the operator with rapid position recognition, the fiber ends of all the fibers surrounding the central fiber may be spread apart at the display end of the cable so that the distance 49 between any two display fiber ends substantially exceeds the distance 50 between the ends of any two fibers at the sunlit end of the cable. Additionally, the central fiber may be tinted a different color than the surrounding fibers to provide instant recognition when the central fiber is illuminated and the grill is positioned correctly.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. On a solar grill, including an outer frame defining an opening in which an essentially flat collector plate is disposed within the frame, a display device for indicating the position of the sun, relative to a position which is perpendicular to the collector plate of such grill, comprising:

an enclosure with an aperture at one end and an opening at the other end operably connected to pass light therebetween, said enclosure connected to said outer frame with the said aperture parallel to the plane of said collector plate;

a flexible, light-transmitting cable having one end connected to said opening, below said aperture, said enclosure having light-absorbing interior walls and said enclosure connected to said grill frame, and said cable having a display end connected to said frame at a location suitable for viewing.

2. A display device as set forth in claim 1, wherein: said light-transmitting cable is a transparent glass fiber material.

3. A display device as set forth in claim 1, wherein: said light-transmitting cable is a transparent plastic fiber material.

4. A display device as set forth in claim 1, wherein: said light-transmitting cable includes a central, light-transmitting fiber and a plurality of additional light-transmitting fibers surrounding and separated from said central fiber, said additional fibers forming at least one circular ring around said central fiber.

5. A display device as set forth in claim 4, wherein: the display end of said central fiber is of a different color than the display ends of said additional fibers.

6. A display device as set forth in claim 4, wherein: one end of said light-transmitting cable is rotated 180 degrees, and fixed to said frame in rotated position, to reverse the relative position of the ends of said additional fibers with respect to said central fiber on an axis through said central fiber.

7. A display device as set forth in claim 4, wherein: the distance between any two adjacent fiber ends within said cable end connected to said opening is less than the distance between any two adjacent fiber ends at the display end of said cable.

8. A display device as set forth in claim 1, wherein:

the distance between said aperture and said cable end connected to said opening below said aperture is greater than the minimum width of said aperture.

9. A display device as set forth in claim 1, wherein: the least interior dimension of said enclosure is greater than the width of said aperture in said enclosure.

10. A display device for indicating the position of the sun, relative to a position which is perpendicular to a surface on a frame, comprising:

an enclosure with an aperture at one end and an opening at the other end operably connected to pass light therebetween, said enclosure connected to said frame with the said aperture parallel to the plane of said surface, a flexible, light-transmitting cable having one end connected to said opening, below said aperture, said enclosure having light-absorbing interior walls and said enclosure connected to said frame, and said cable having a display end connected to said frame at a location suitable for viewing.

* * * * *